United States Patent
Jung et al.

(10) Patent No.: US 9,708,744 B2
(45) Date of Patent: Jul. 18, 2017

(54) MOTOR DRIVING APPARATUS AND LAUNDRY TREATMENT MACHINE INCLUDING THE SAME

(71) Applicant: LG ELECTRONICS INC., Seoul (KR)

(72) Inventors: Hansu Jung, Changwon-si (KR); Jain Koo, Changwon-si (KR); Soongkeun Lee, Changwon-si (KR)

(73) Assignee: LG ELECTRONICS INC., Seoul (KR)

( * ) Notice: Subject to any disclaimer, the term of this patent is extended or adjusted under 35 U.S.C. 154(b) by 236 days.

(21) Appl. No.: 14/535,595

(22) Filed: Nov. 7, 2014

(65) Prior Publication Data

US 2015/0128660 A1 May 14, 2015

(30) Foreign Application Priority Data

Nov. 8, 2013 (KR) .................. 10-2013-0135654

(51) Int. Cl.
| | | |
|---|---|---|
| *D06F 37/30* | (2006.01) | |
| *D06F 33/02* | (2006.01) | |
| *H02P 6/18* | (2016.01) | |
| *H02P 6/21* | (2016.01) | |
| *H02P 21/34* | (2016.01) | |
| *H02P 6/182* | (2016.01) | |

(52) U.S. Cl.
CPC ............ *D06F 37/304* (2013.01); *D06F 33/02* (2013.01); *H02P 6/182* (2013.01); *H02P 6/21* (2016.02); *H02P 21/34* (2016.02)

(58) Field of Classification Search
None
See application file for complete search history.

(56) References Cited

U.S. PATENT DOCUMENTS

2009/0056385 A1  3/2009  Maekawa

FOREIGN PATENT DOCUMENTS

| | | |
|---|---|---|
| CN | 1375125 | 10/2002 |
| CN | 101383583 | 3/2009 |
| CN | 101964624 | 2/2011 |
| CN | 102291079 | 12/2011 |
| CN | 102437813 | 5/2012 |
| CN | 102487262 | 6/2012 |
| CN | 102545749 | 7/2012 |
| EP | 1 221 765 A1 | 7/2002 |

(Continued)

OTHER PUBLICATIONS

JP Pub. No. 2001-238480 translation.*

(Continued)

*Primary Examiner* — Michael Barr
*Assistant Examiner* — Rita Adhlakha
(74) *Attorney, Agent, or Firm* — KED & Associates, LLP

(57) ABSTRACT

The laundry treatment machine includes an inverter to convert direct current (DC) voltage into alternating current (AC) voltage and to output the AC voltage to a motor. The laundry treatment machine includes an inverter controller to control the inverter to supply current corresponding to a direction opposite to back electromotive force generated from the motor to the motor so as to align the motor during a starting operation of the motor. It is feasible to rapidly align a rotor of the motor during the starting operation of the motor.

14 Claims, 10 Drawing Sheets

(56) References Cited

FOREIGN PATENT DOCUMENTS

| | | |
|---|---|---|
| EP | 2 629 414 A1 | 8/2013 |
| JP | 2001-161094 | 6/2001 |
| JP | 2001-238480 | 8/2001 |
| JP | 2001-238480 A | 8/2001 |
| JP | 2003-135883 | 5/2003 |
| JP | 2007-236048 A | 9/2007 |
| JP | 2007-236102 A | 9/2007 |
| JP | 2009-065764 | 3/2009 |
| KR | 10-2006-0068845 A | 6/2006 |
| KR | 10-0629007 B1 | 9/2006 |
| WO | WO 2011/054032 A1 | 5/2011 |

OTHER PUBLICATIONS

Australian Examination Report dated Apr. 15, 2015 issued in Application No. 2014259483.
Australian Examination Report dated Apr. 15, 2015 issued in Application No. 2014259555.
Chinese Office Action dated May 4, 2016 issued in Application No. 201410645337.8 (English translation attached).
Chinese Office Action dated May 4, 2016 issued in Application No. 201410643600.X (English translation attached).
Chinese Office Action dated May 5, 2016 issued in Application No. 201410643584.4 (English translation attached).
European Search Report dated Jun. 3, 2015 issued in Application No. 14192291.4.
Song Chi, et al: "Sliding-Mode Sensorless Control of Direct-Drive PM Synchronous Motors for Washing Machine Applications"; IEEE Transactions on Industry Applications, IEEE Service Center; Piscataway, NJ; vol. 45, No. 2; Mar. 1, 2009; pp. 582-590.
European Search Report dated Jul. 28, 2015 issued in Application No. 14192222.9.
U.S. Appl. No. 14/535,702, filed Nov. 7, 2014, Rita P. Adhlakha.
U.S. Appl. No. 14/536,004, filed Nov. 7, 2014, Rita P. Adhlakha.
U.S. Appl. No. 14/535,780, filed Nov. 7, 2014, Rita P. Adhlakha.
Chinese Office Action dated Sep. 1, 2016 issued in Application No. 201410645240.7 (with English translation).
Korean Office Action dated Oct. 4, 2016 issued in Application No. 10-2013-0135654.
Korean Office Action dated Oct. 4, 2016 issued in Application No. 10-2013-0135656.
Korean Office Action dated Oct. 4, 2016 issued in Application No. 10-2013-0135657.
United States Office Action dated Nov. 1, 2016 issued in U.S. Appl. No. 14/535,702.
United States Office Action dated Nov. 1, 2016 issued in U.S. Appl. No. 14/536,004.
United States Office Action dated Nov. 14, 2016 issued in U.S. Appl. No. 14/535,780.

* cited by examiner

FIG. 5B
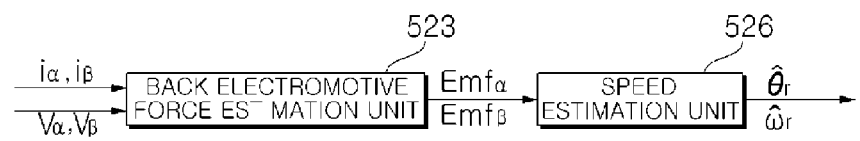
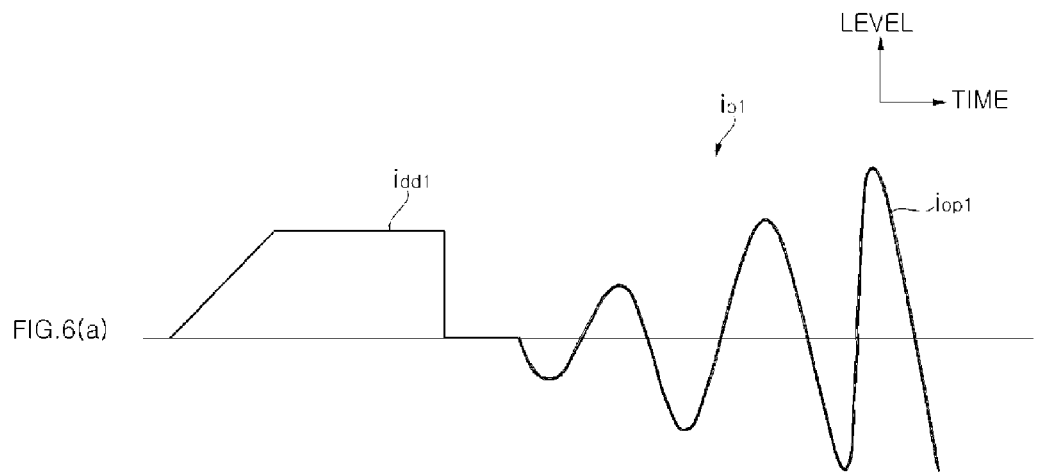
FIG.6(a)
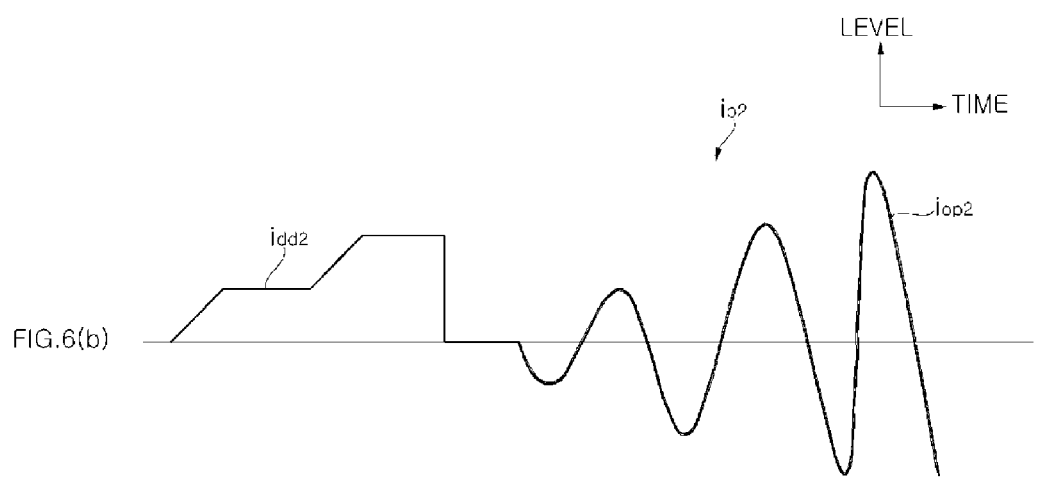
FIG.6(b)

MOTOR DRIVING APPARATUS AND LAUNDRY TREATMENT MACHINE INCLUDING THE SAME

CROSS-REFERENCE TO RELATED APPLICATION

This application claims priority under 35 U.S.C. §119 to Korean Application No. 10-2013-0135654, filed on Nov. 8, 2013 in the Korean Intellectual Property Office, whose entire disclosure is incorporated herein by reference.

BACKGROUND

1. Field

The present disclosure relates to a motor driving apparatus and a laundry treatment machine including the same.

2. Background

Generally, a laundry treatment machine washes laundry using frictional force between a washing tub rotated by a driving force of a motor and the laundry in a state in which the laundry is contained in the washing tub together with a detergent and wash water. It is possible to wash the laundry without damage to the laundry and entanglement of the laundry.

The laundry treatment machine generally includes a position sensor to sense a rotor position of the motor. However, a laundry treatment machine which does not use a position sensor is under development so as to reduce manufacturing cost of the laundry treatment machine.

BRIEF DESCRIPTION OF THE DRAWINGS

The embodiments will be described in detail with reference to the following drawings in which like reference numerals refer to like elements wherein:

FIG. 5B is an internal block diagram of an estimation unit shown in FIG. 5A;

FIG. 6(a)-6(b) is a view showing an example of alternating current (AC) current supplied to a motor shown in FIG. 4;

DETAILED DESCRIPTION

A laundry treatment machine described in this specification is a laundry treatment machine that is capable of estimating the position of a rotor of a motor to rotate a washing tub without the provision of a position sensing unit or sensor for sensing the position of the rotor of the motor, i.e. in a sensorless mode.

Figure 1:
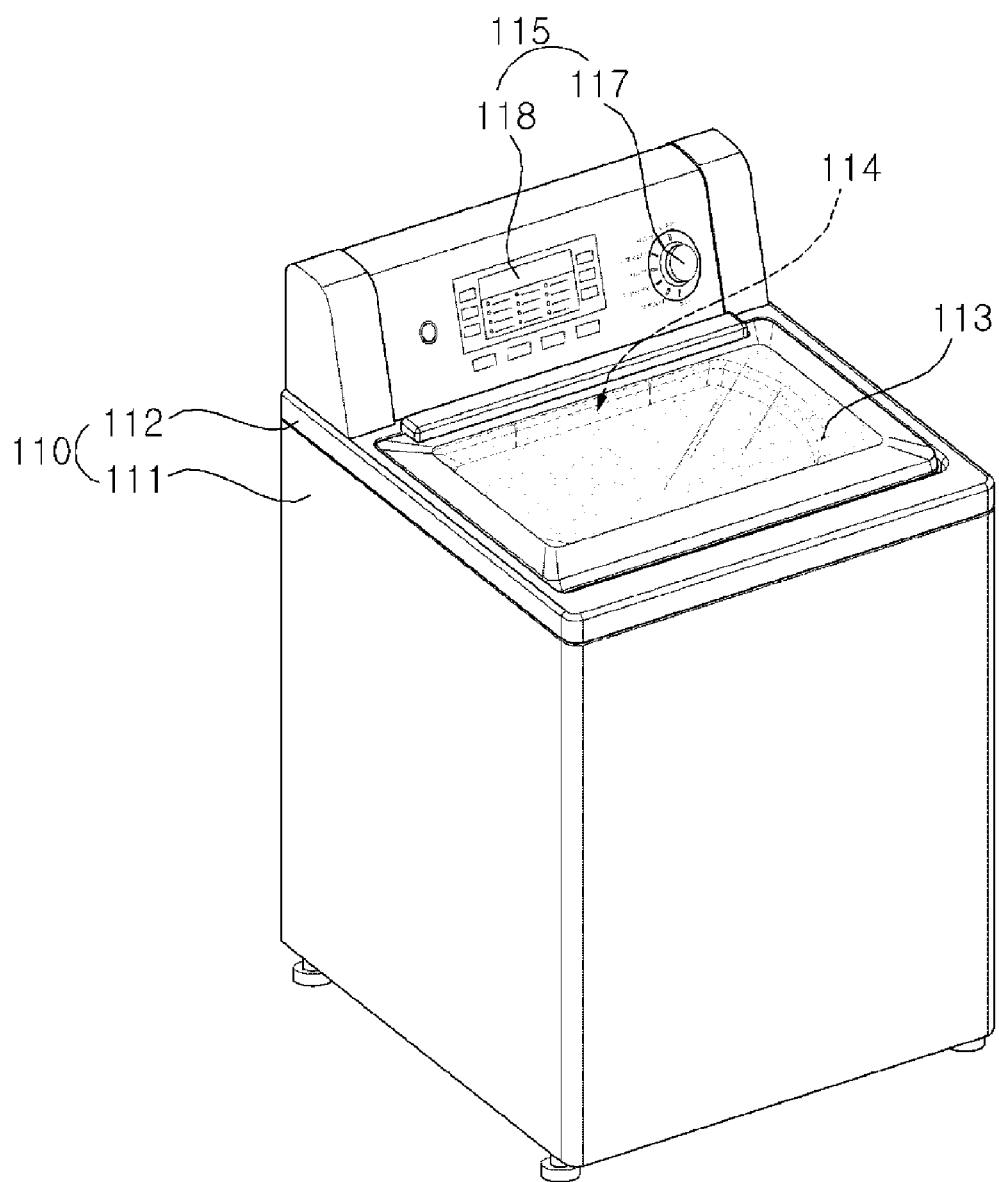
FIG. 1 is a perspective view showing a laundry treatment machine according to an embodiment of the present disclosure.
Figure 2:
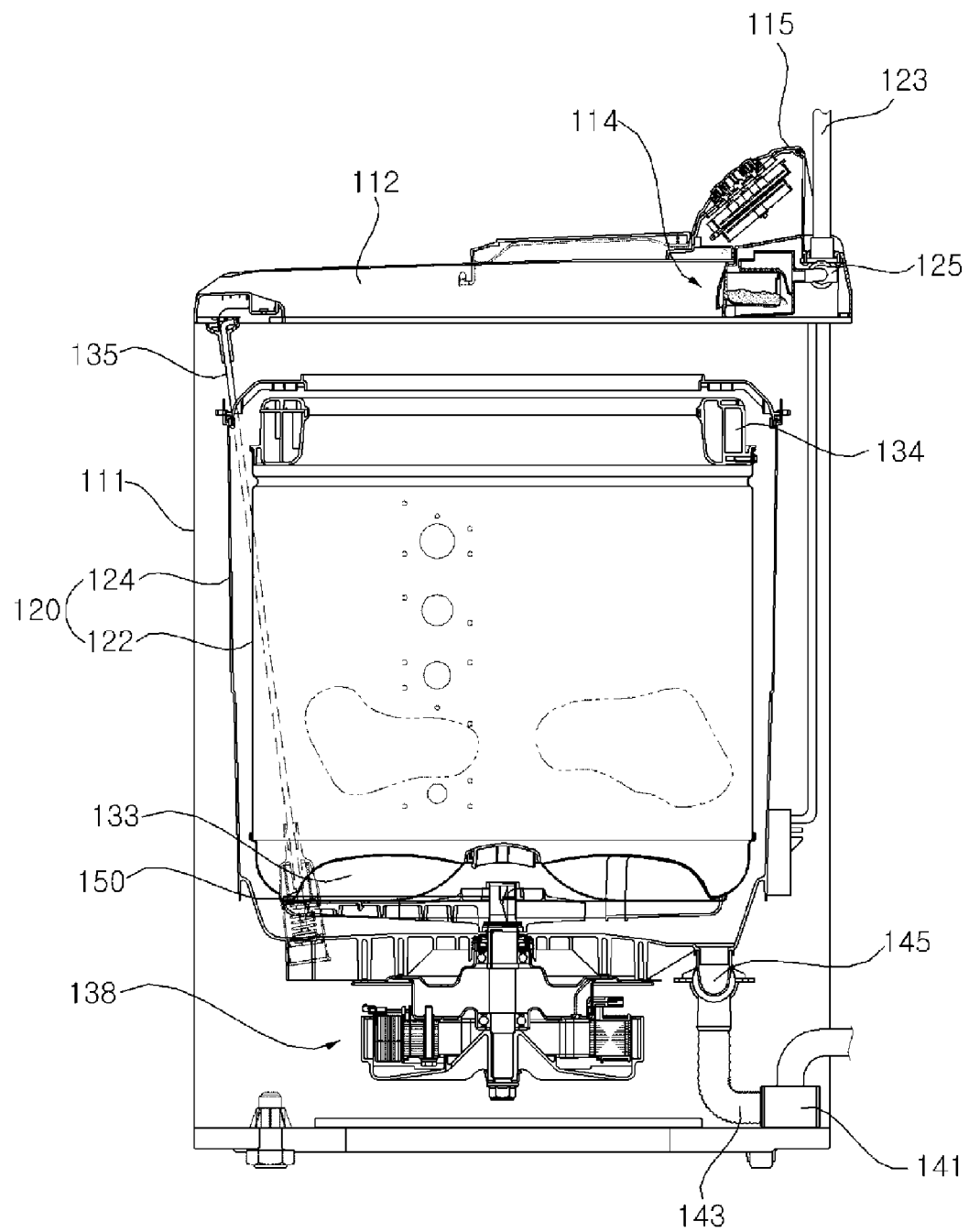
FIG. 2 is a side sectional view of the laundry treatment machine shown in FIG. 1.

FIG. 1 is a perspective view showing a laundry treatment machine according to an embodiment of the present disclosure and FIG. 2 is a side sectional view of the laundry treatment machine shown in FIG. 1. A laundry treatment machine 100 is a top load type laundry treatment machine configured such that laundry is introduced into a washing tub from above. The top load type laundry treatment machine includes a washing machine that washes, rinses, and spin-dries laundry introduced thereinto and a drying machine that dries wet laundry introduced thereinto.

The washing machine 100 includes a casing 110 forming the external appearance of the washing machine 100, and a control panel 115 having manipulation keys for allowing a user to input various control commands. The control panel may also include a display for displaying information regarding an operation state of the washing machine 100 for providing a user interface. A door 113 of the washing machine 100 is hinged to the casing 110 for opening and closing an introduction port through which laundry is introduced and removed.

The casing 110 may include a main body 111 defining a space in which various components of the washing machine 100 are received and a top cover 112 provided at the upper side of the main body 111, the top cover 112 defining a laundry introduction port through which laundry is introduced into an inner tub 122.

Although the casing 110 is described as including the main body 111 and the top cover 112, the present disclosure is not limited thereto. For example, the casing 110 may merely form the external appearance of the washing machine 100.

Although a support bar 135 is described as being coupled to one of the components constituting the casing 110, e.g. the top cover 112, the present disclosure is not limited thereto. For example, the support bar 135 may be coupled to any fixed part of the casing 110.

The door 113 opens and closes the laundry introduction port formed at the top cover 112. The door 113 may include a transparent member, such as tempered glass, through which the user may see the interior of the main body 111.

The washing machine 100 may include a washing tub 120. The washing tub 120 may include an outer tub 124 for containing wash water and an inner tub 122 rotatably mounted in the outer tub 124 for receiving laundry. At the upper part of the washing tub 120 may be mounted a balancer 134 for compensating for eccentricity of the washing tub 120 generated during rotation of the washing tub 120. The washing machine 100 may include a pulsator 133 rotatably mounted at the lower part of the washing tub 120.

A driving device 138 provides driving force necessary for rotating the inner tub 122 and/or the pulsator 133. The washing machine 100 may include a clutch for selectively transmitting the driving force of the driving device 138 to the inner tub 122 and the pulsator 133 such that only the inner tub 122 is rotated, only the pulsator 133 is rotated, or both the inner tub 122 and the pulsator 133 are rotated. The driving device 138 is operated or controlled by a driving unit 220, i.e. a driving circuit, shown in FIG. 3, which will hereinafter be described with reference to FIG. 3 and the following drawings.

The top cover 112 is removably provided with a detergent box 114 for receiving various additives, such as a detergent, a fabric softener, and/or a decolorant. Wash water, introduced through a water supply channel 123, is supplied into the inner tub 122 via the detergent box 114.

The inner tub 122 is provided with a plurality of holes through which the wash water supplied into the inner tub 122 flows into the outer tub 124. The washing machine 100 may include a water supply valve 125 for controlling the water supply channel 123.

The wash water may be drained from the outer tub 124 through a drainage channel 143. The washing machine 100 may include a drainage valve for controlling the drainage channel 143 and a drainage pump 141 for pumping the wash water out.

The outer tub 124 is suspended in the casing 110 by the support bar 135. One end of the support bar 135 is connected to the casing 110 and the other end of the support bar 135 is connected to the outer tub 124 via a suspension 150

The suspension 150 absorbs vibration of the outer tub 124 during operation of the washing machine 100. For example, the outer tub 124 may be vibrated by vibration generated from the inner tub 122 during rotation of the inner tub 122. The suspension 150 may absorb vibration generated from the outer tub 124 due to various causes, such as eccentricity of laundry received in the inner tub 122, rotational speed of the inner tub 122, or resonance characteristics of the inner tub 122, during rotation of the inner tub 122.

Figure 3:
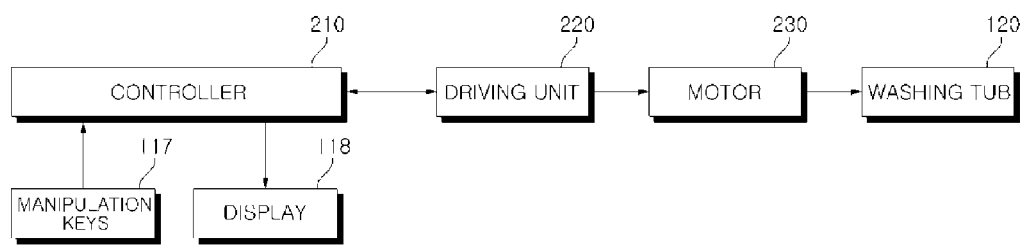
FIG. 3 is an internal block diagram of the laundry treatment machine shown in FIG. 1.

FIG. 3 is an internal block diagram of the laundry treatment machine shown in FIG. 1. A driving circuit or unit 220 of the laundry treatment machine 100 is controlled by a controller 210. The driving unit 220 drives or controls a motor 230, which rotates the washing tub 120.

The controller 210 is operated according to an operation signal from the manipulation keys 117. As a result, washing, rinsing, and spin-drying cycles of the laundry treatment machine 100 may be carried out. The controller 210 may also control the display 118 to display a washing course, washing time, spin-drying time, rinsing time, or a current operation state.

The controller 210 may also control the driving unit 220 to operate the motor 230. A position sensing unit for sensing the position of a rotor of the motor is not provided at the inside or the outside of the motor 230. Accordingly, the driving unit 220 controls the motor 230 in a sensorless mode.

The driving unit 220 drives or controls the motor 230. The driving unit 220 may include an inverter, an inverter controller, an output current detection unit or an output current detector E (see FIG. 4) for detecting output current $i_o$ flowing in the motor 230, and an output detector or an output voltage detection unit F (see FIG. 4) for detecting output voltage $V_o$ applied to the motor 230. The driving unit 220 may further include a converter for supplying a direct current (DC) voltage to be input the inverter (not shown).

For example, an inverter controller 430 (see FIG. 4) of the driving unit 220 estimates the position of the rotor of the motor 230 based on the output current $i_o$ and the output voltage $V_o$ and controls the motor 230 to be rotated based on the estimated position of the rotor.

The inverter controller 430 (see FIG. 4) generates a pulse width modulation (PWM)-based switching control signal $S_{ic}$ (see FIG. 4) based on the output current $i_o$ and the output voltage $V_o$ and outputs the generated switching control signal $S_{ic}$ to the inverter. The inverter performs a high-speed switching operation to supply AC voltage of a predetermined frequency to the motor 230. The motor 230 is rotated by the AC voltage of the predetermined frequency.

The controller 210 may sense laundry quantity based on the output current $i_o$ detected by the output current detection unit E. For example, the controller 210 may sense laundry quantity based on a current value $i_o$ of the motor 230 during rotation of the washing tub 120.

The controller 210 may also sense eccentric quantity of the washing tub 120, i.e. unbalance (UB) of the washing tub 120. The eccentric quantity of the washing tub 120 may be sensed based on a ripple component of the output current $i_o$ detected by the output current detection unit E or change quantity of rotational speed of the washing tub 120.

Figure 4:
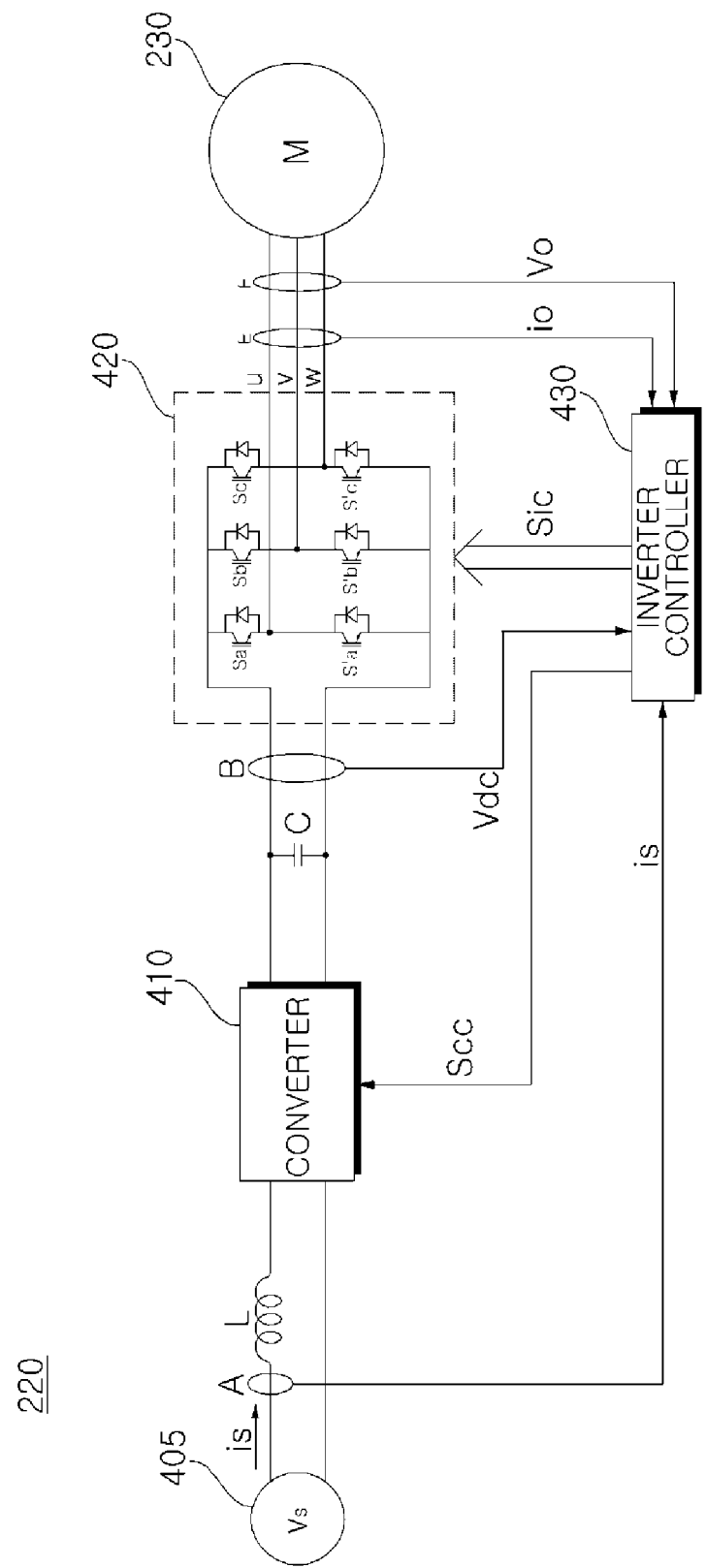
FIG. 4 is an internal circuit diagram of a driving unit shown in FIG. 3.

FIG. 4 is an internal circuit diagram of the driving unit shown in FIG. 3. The driving unit 220 according to the embodiment of the present disclosure drives a sensorless motor. The driving unit 220 may include a converter 410, an inverter 420, an inverter controller 430, a voltage detector or a DC terminal voltage detection unit B, a smoothing capacitor C, an output current detection unit E, and a voltage detector or an output voltage detection unit F. The driving unit 220 may further include a current detector or an input current detection unit A and an inductor L.

The inductor L is disposed between a commercial AC voltage source 405 ($V_s$) and the converter 410 for performing a power factor correction or boosting operation. The inductor L may function to restrict harmonic current due to high-speed switching of the converter 410.

The input current detection unit A may detect input current $i_s$ input from the commercial AC voltage source 405. A current transformer (CT) or a shunt resistor may be used as the input current detection unit A. The detected input current $i_s$, which is a pulse type discrete signal, may be input to the inverter controller 430.

The converter 410 converts voltage having output from the commercial AC voltage source 405 and passed through the inductor L into DC voltage and outputs the converted DC voltage. Although the commercial AC voltage source 405 is shown as a single phase AC voltage source in the drawing, the commercial AC voltage source 405 may be a three phase AC voltage source. The internal structure of the converter 410 is changed based on the type of the commercial AC voltage source 405.

When the converter 410 includes only diodes without a switching device, the converter 410 may perform a rectification operation without an additional switching operation.

For example, four diodes may be arranged in the shape of a bridge for the single phase AC voltage source and six diodes may be arranged in the shape of a bridge for the three phase AC voltage source. Alternatively, a half-bridge type converter including two switching devices and four diodes connected to the switching devices may be used as the converter 410. Six switching devices and six diodes may be used for the three phase AC voltage source.

In a case in which the converter 410 includes a switching device, boosting, power factor improvement, and DC voltage conversion may be performed according to a switching operation of the switching device.

The smoothing capacitor C smooths input voltage and stores the smoothed voltage. Although one smoothing capacitor C is shown in the drawing, a plurality of smoothing capacitors C may be provided to secure device stability.

Although the smoothing capacitor C is shown as being connected to the output terminal of the converter 410 in the drawing, DC voltage may be directly input to the smoothing capacitor C. For example, DC voltage from a solar cell may be directly input to the smoothing capacitor C or may be DC/DC converted and then input to the smoothing capacitor C.

Meanwhile, both terminals of the smoothing capacitor C may be referred to as DC terminals or DC link terminals since DC voltage is stored in the smoothing capacitor C. The DC terminal voltage detection unit B may detect DC terminal voltage $V_{dc}$ applied between the both terminals of the smoothing capacitor C. The DC terminal voltage detection unit B may include a resistor and an amplifier. The detected DC terminal voltage $V_{dc}$, which is a pulse type discrete signal, may be input to the inverter controller 430.

The inverter 420 may include a plurality of inverter switching devices. The inverter 420 may convert the smoothed DC terminal voltage $V_{dc}$ into three phase AC voltages $V_a$, $V_b$, and $V_c$ of predetermined frequencies according to on/off operations of the switching devices and output the converted three phase AC voltages $V_a$, $V_b$, and $V_c$ to the motor 230 as a three phase synchronous motor.

In the inverter 420, first switching devices or transistors Sa, Sb, and Sc and second switching devices or transistors S'a, S'b, and S'c are connected in series to each other in pairs. As a result, three pairs of first and second switching devices Sa &S'a, Sb &S'b, and Sc&S'c are connected in parallel to one another. A diode is connected in reverse parallel to each of the switching devices Sa, S'a, Sb, S'b, Sc, and S'c.

The switching devices or transistors of the inverter 420 are turned on/off based on an inverter switching control signal $S_{ic}$ from the inverter controller 430. Based on switching, three phase AC voltages of predetermined frequencies are output to three phase synchronous motor 230.

Based on the inverter controller 430 receiving the output current $i_o$ detected by the output current detection unit E and the output voltage $V_o$ detected by the output voltage detection unit F, the inverter controller 430 may control a switching operation of the inverter 420 in a sensorless mode.

The inverter controller 430 outputs the inverter switching control signal $S_{ic}$ to the inverter 420 so as to control the switching operation of the inverter 420. The inverter switching control signal $S_{ic}$, which is a PWM-based switching control signal, is generated and output based on the output current $i_o$ detected by the output current detection unit E and the output voltage $V_o$ detected by the output voltage detection unit F. Output of the inverter switching control signal $S_{ic}$ from the inverter controller 430 will hereinafter be described in detail with reference to FIGS. 5A and 5B.

The output current detection unit E detects output current $i_o$ flowing between the inverter 420 and the three phase synchronous motor 230. The output current detection unit E detects current flowing in the motor 230. The output current detection unit E may detect all three phase output currents $i_a$, $i_b$, and $i_c$. Alternatively, the output current detection unit E may detect two phase output currents using three phase equilibrium.

The output current detection unit E may be located between the inverter 420 and the motor 230. In order to detect current, a current transformer (CT) or a shunt resistor may be used as the output current detection unit E.

In a case in which a plurality of shunt resistors is used, three shunt resistors may be located between the inverter 420 and the synchronous motor 230 or one end of each of three shunt resistors may be connected to a corresponding one of the three second switching devices S'a, S'b, and S'c of the inverter 420. Alternatively, two shunt resistors may be used based on three phase equilibrium. In a case in which one shunt resistor is used, the shunt resistor may be disposed between the capacitor C and the inverter 420.

The detected output current $i_o$, which is a pulse type discrete signal, may be input to the inverter controller 430. An inverter switching control signal $S_{ic}$ is generated based on the detected output current $i_o$. The detected output current $i_o$ may correspond to three phase output currents $i_a$, $i_b$, and $i_c$.

According to a sensorless position estimation method described in this specification, a position error is increased in a case in which the rotor position of the motor is estimated based on only output current detected by the output current detection unit E without using the output voltage detection unit F during a low-speed operation time period, which is a time period of 0 to 100 rpm. On the other hand, a position error is not increased during a high-speed operation time period, which is a time period of more than 100 rpm. Hence, the output voltage detection unit F is used in addition to the output current detection unit E.

The output voltage detection unit F is located between the inverter 420 and the motor 230 for detecting output voltage applied from the inverter 420 to the motor 230. In a case in which the inverter 420 is operated according to a PWM-based switching control signal, the output voltage may be PWM-based pulse type voltage.

The detected PWM-based output voltage $V_o$, which is a pulse type discrete signal, may be applied to the inverter controller 430. An inverter switching control signal $S_{ic}$ is generated based on the detected output voltage $V_o$. The detected output voltage $V_o$ may correspond to three phase AC voltages $V_a$, $V_b$, and $V_c$.

The three phase synchronous motor 230 may include stators and a rotor. All three phase AC voltages of predetermined frequencies are applied to coils of all three phase (a-phase, b-phase, and c-phase) stators to rotate the rotor.

For example, the motor 230 may include a Surface-Mounted Permanent-Magnet Synchronous Motor (SMPMSM), and Interior Permanent Magnet Synchronous Motor (IPMSM), and a Synchronous Reluctance Motor (SynRM). The SMPMSM and the IPMSM are Permanent Magnet Synchronous Motors (PMSM) each having a permanent magnet, whereas the SynRM is a motor having no permanent magnet.

In a case in which the converter 410 includes a switching device, the inverter controller 430 may control a switching operation of the switching device of the converter 410. The inverter controller 430 may receive the input current $i_s$ detected by the input current detection unit A. The inverter controller 430 may also output a converter switching control signal $S_{cc}$ to the converter 410 so as to control a switching operation of the converter 410. The converter switching control signal $S_{cc}$, which is a PWM-based switching control signal, is generated and output based on the input current $i_s$ detected by the input current detection unit A.

Figure 5A:
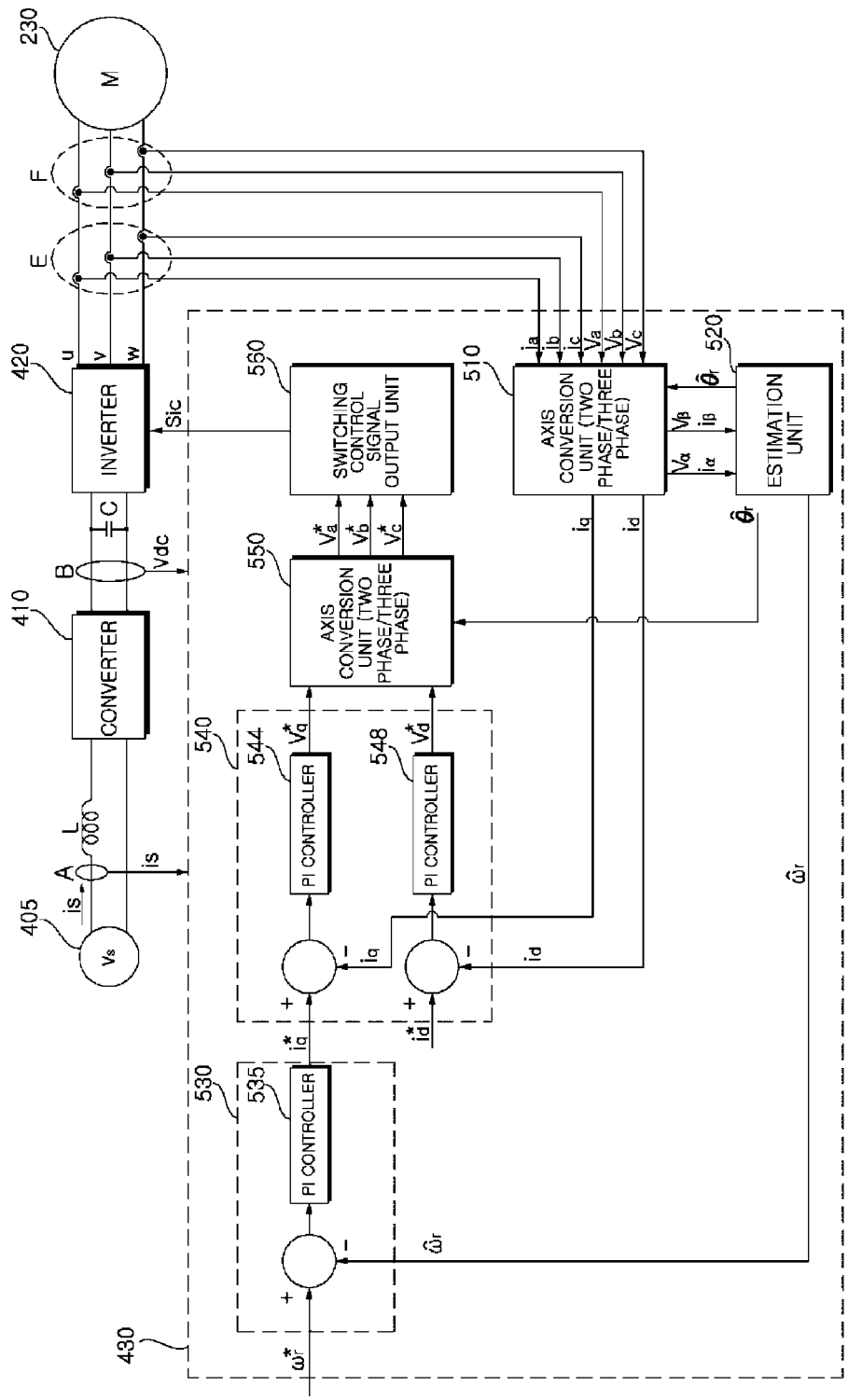
FIG. 5A is an internal block diagram of an inverter controller shown in FIG. 4.

FIG. 5A is an internal block diagram of the inverter controller shown in FIG. 4 and FIG. 5B is an internal block diagram of an estimation unit shown in FIG. 5A. The inverter controller 430 may include an axis conversion circuitry or unit 510, an estimation circuitry or unit 520, a current command generation circuitry unit 530, a voltage command generation circuitry or unit 540, an axis conversion circuitry or unit 550, and a switching control signal output circuitry or unit 560.

The axis conversion unit 510 may receive the output currents $i_a$, $i_b$, and $i_c$ detected by the output current detection unit E and transform the received the output currents $i_a$, $i_b$, and $i_c$ into two phase currents $i_\alpha$ and $i_\beta$ of a stationary coordinate system and two phase currents $i_d$ and $i_q$ of a rotating coordinate system.

The axis conversion unit 510 receives the PWM-based output voltages $V_a$, $V_b$, and $V_c$ detected by the output voltage detection unit F to calculate a duty and calculates pole voltage $V_{pn}$ based on the calculated duty. Equation 1 below shows a pole voltage calculation method.

$$Vpn = \frac{1}{T}\int Vdcdt = Vdc\frac{Ton}{T} \qquad \text{[Equation 1]}$$

where $V_{dc}$ indicates DC terminal voltage detected by the DC terminal voltage detection unit B, T indicates a control time period, i.e. a unit time period of a carrier signal for generating a PWM switching control signal, and $T_{on}$ indicates ON time, i.e. a duty, within a unit time period T.

The axis conversion unit 510 calculates three phase pole voltages $V_{un}$, $V_{vn}$, and $V_{wn}$ in response to the PWM-based three phase output voltages $V_a$, $V_b$, and $V_c$.

The axis conversion unit 510 may calculate offset voltage $V_{offset}$ using the three phase pole voltages $V_{un}$, $V_{vn}$, and $V_{wn}$ as represented by Equation 2.

$$Voffset=(Vun+Vvn+Vwn)/3 \qquad \text{[Equation 2]}$$

The axis conversion unit 510 may calculate three phase voltages $V_{as}$, $V_{bs}$, and $V_{cs}$ applied to the respective phases of the motor 230 using the three phase pole voltages $V_{un}$, $V_{vn}$, and $V_{wn}$ and the offset voltage $V_{offset}$ as represented by Equation 3.

$$Vas=Vun-Voffset$$

$$Vbs=Vvn-Voffset$$

$$Vcs=Vwn-Voffset \qquad \text{[Equation 3]}$$

The axis conversion unit 510 may calculate two phase voltages $V_\alpha$ and $V_\beta$ of a stationary coordinate system using the three phase voltages $V_{as}$, $V_{bs}$, and $V_{cs}$ as represented by Equation 4. Alternatively, the axis conversion unit 510 may transform the two phase voltages $V_\alpha$ and $V_\beta$ of the stationary coordinate system into two phase voltages $V_d$ and $V_q$ of a rotating coordinate system.

$$\begin{bmatrix} V_\alpha \\ V_\beta \end{bmatrix} = \begin{bmatrix} 1 & 0 & 0 \\ 0 & 1/\sqrt{3} & -1/\sqrt{3} \end{bmatrix} \begin{bmatrix} V_{as} \\ V_{bs} \\ V_{cs} \end{bmatrix} \qquad \text{[Equation 4]}$$

The axis conversion unit 510 may output the transformed two phase currents $i_\alpha$ and $i_\beta$ of the stationary coordinate system, the transformed two phase voltages $V_\alpha$ and $V_\beta$ of the stationary coordinate system, the transformed two phase currents $i_d$ and $i_q$ of the rotating coordinate system, and the transformed two phase voltages $V_d$ and $V_q$ of the rotating coordinate system to the outside.

The estimation unit 520 may receive the axis-transformed two phase currents $i_\alpha$ and $i_\beta$ of the stationary coordinate system and the axis-transformed two phase voltages $V_\alpha$ and $V_\beta$ of the stationary coordinate system from the axis conversion unit 510 to estimate a rotor position θ and speed ω of the motor 230.

Referring to FIG. 5B, the estimation unit 520 may include a back electromotive force estimation circuitry or unit 523 for estimating back electromotive force caused in the motor 230 and a speed estimation circuitry or unit 526 for estimating a rotor position $\hat{\theta}_r$ and speed $\hat{\omega}_r$ of the motor 230.

The back electromotive force estimation unit 523 may receive the two phase currents $i_\alpha$ and $i_\beta$ of the stationary coordinate system and the two phase voltages $V_\alpha$ and $V_\beta$ of the stationary coordinate system from the axis conversion unit 510 to estimate two phase back electromotive forces $Emf_\alpha$ and $Emf_\beta$ of the stationary coordinate system using a back electromotive force observer based on the stationary coordinate system.

The two phase back electromotive forces $Emf_\alpha$ and $Emf_\beta$ of the stationary coordinate system may be expressed as a function for the rotational speed and rotor position of the motor as represented by Equation 5.

$$\begin{bmatrix} Emf_\alpha \\ Emf_\beta \end{bmatrix} = \begin{bmatrix} \omega_r \lambda \sin\theta_r \\ -\omega_r \lambda \cos\theta_r \end{bmatrix} \qquad \text{[Equation 5]}$$

where $\omega_r$ indicates a rotational speed of the motor, $\theta_r$ indicates a rotor position of the motor, and λ indicates observed magnetic flux.

The speed estimation unit 526 may estimate the rotor position $\hat{\theta}_r$ of the motor 230 through arc tangent calculation using the estimated back electromotive forces $Emf_\alpha$ and $Emf_\beta$ as represented by Equation 6.

$$\hat{\theta}_r = \tan^{-1}\left(\frac{-Emf_\alpha}{Emf_\beta}\right) \qquad \text{[Equation 6]}$$

$$= \tan^{-1}\left(\frac{\omega_r \lambda \sin\theta_r}{\omega_r \lambda \cos\theta_r}\right)$$

The speed estimation unit 526 may estimate the rotor position $\hat{\theta}_r$ and speed $\hat{\omega}_r$ of the motor 230 using an all dimensional speed observer after the arc tangent calculation.

The estimation unit 520 may output the resultant estimated position $\hat{\theta}_r$ and the resultant estimated speed $\hat{\omega}_r$ based on the input two phase currents $i_\alpha$ and $i_\beta$ of the stationary coordinate system and the input two phase voltages $V_\alpha$ and $V_\beta$ of the stationary coordinate system.

The current command generation unit 530 generates a current command value $i^*_q$ based on the estimated speed $\hat{\omega}_r$ and a speed command value $\omega^*_r$. For example, a PI (Proportional-Integral) controller 535 of the current command generation unit 530 may perform PI control based on a difference between the estimated speed $\hat{\omega}_r$ and the speed command value $\omega^*_r$ to generate a current command value $i^*_q$. Although a q-axis current command value $i^*_q$ is shown as the current command value in the drawing, it is possible to generate a d-axis current command value $i^*_d$ together with the q-axis current command value $i^*_q$. The d-axis current command value $i^*_d$ may be set to 0.

Meanwhile, the speed command value $\omega^*_r$ may be manually set according to operation signal from the manipulation keys 117 or automatically set according to washing, rinsing, or spin-drying cycles of the laundry treatment machine 100.

The current command generation unit 530 may further include a limiter for limiting a level of the current command value $i^*_q$ such that the current command value $i^*_q$ does not exceed an allowable range.

The voltage command generation unit 540 may generate d-axis and q-axis voltage command values $V^*_d$ and $V^*_q$ based on d-axis and q-axis currents $i_d$ and $i_q$ axis-transformed into a two phase rotating coordinate system by the axis conversion unit and the current command value $i^*_d$ and $i^*_q$ generated by the current command generation unit 530. The d axis and the q axis may mean a rotating coordinate system corresponding to flux and torque. The d-axis voltage command value may correspond to a flux voltage command value and the q-axis voltage command value may correspond to a torque voltage command value. In the following description, the terms "d-axis voltage command value" and "q-axis voltage command value" will be mainly used instead of the terms "flux voltage command value" and "torque voltage command value".

For example, a PI controller 544 of the voltage command generation unit 540 may perform PI control based on a difference between the q-axis current $i_q$ and the q-axis current command value $i^*_q$ to generate a q-axis voltage command value $V^*_q$. In addition, a PI controller 548 of the voltage command generation unit 540 may perform PI control based on a difference between the d-axis current $i_d$ and the d-axis current command value $i^*_d$ to generate a d-axis voltage command value $V^*_d$. The d-axis voltage command value $V^*_d$ may be set to 0 in response to a case in which the d-axis current command value $i^*_d$ is set to 0.

The voltage command generation unit 540 may further include a limiter for limiting levels of the d-axis and q-axis voltage command values $V^*_d$ and $V^*_q$ such that the d-axis and q-axis voltage command values $V^*_d$ and $V^*_q$ do not exceed allowable ranges. The generated d-axis and q-axis voltage command values $V^*_d$ and $V^*_q$ are input to the axis conversion unit 550.

The axis conversion unit 550 receives the estimated position $\hat{\theta}_r$ and the d-axis and q-axis voltage command values $V^*_d$ and $V^*_q$ from the estimation unit 520 to perform axis transformation. The axis conversion unit 550 performs transformation from a two phase rotating coordinate system to a two phase stationary coordinate system. At this time, the position $\hat{\theta}_r$ estimated by the estimation unit 520 may be used.

Subsequently, the axis conversion unit 550 performs transformation from the two phase stationary coordinate system to a three phase stationary coordinate system. As a result, the axis conversion unit 550 outputs three phase output voltage command values V*a, V*b, and V*c. The switching control signal output unit 560 generates and outputs a PWM-based inverter switching control signal $S_{ic}$ based on the three phase output voltage command values V*a, V*b, and V*c.

The output inverter switching control signal $S_{ic}$ may be converted into a gate driving signal by a gate driving unit and then input to a gate of each switching device of the inverter 420. As a result, the respective switching devices Sa, S'a, Sb, S'b, Sc, and S'c of the inverter 420 may perform switching operations.

FIG. 6 is a view showing an example of AC current supplied to the motor shown in FIG. 4. According to switching operation of the inverter 420, current flows in the motor 230 as shown in FIG. 6.

An operation time period of the motor 230 may be divided into a starting operation time period for aligning the rotor of the motor and a normal operation time period for normally rotating the motor.

FIG. 6(a) exemplarily shows an example of a current waveform $i_{o1}$ supplied to the motor 230. Specifically, a constant current $i_{dd1}$ may be supplied to the motor 230 so as to align the rotor of the motor 230 during the starting operation time period. Subsequently, an AC current $i_{op1}$ may be supplied to the motor 230 so as to rotate the motor 230 during the normal operation time period.

During the starting operation time period, the inverter controller 430 may set the estimated speed to be 0 such that the q-axis current command value $i^*_q$ is 0 and set the d-axis current command value $i^*_d$ to be a specific value. And the inverter controller 430 may output the inverter switching control signal Sic based on the d-axis current command value $i^*_d$. Thus, the constant current $i_{dd1}$ may be supplied to the motor 230.

During the normal operation time period, the inverter controller 430 may generate current command values $i^*_d$ and $i^*_q$ based on the estimated speed not to be 0, generate voltage command values $V^*_d$ and $V^*_q$ based on the current command values $i^*_d$ and $i^*_q$, generate and output the inverter switching control signal Sic based on the voltage command values $V^*_d$ and $V^*_q$. Thus, the AC current $i_{op1}$ may be supplied to the motor 230 so as to rotate the motor 230 at a constant speed or at an accelerated speed.

FIG. 6(b) exemplarily shows another example of a current waveform $i_{o2}$ supplied to the motor 230. Specifically, a constant first level current $i_{dd2}$ and a constant second level current may be supplied to the motor 230 so as to align the rotor of the motor 230 during the starting operation time period. Subsequently, an AC current $i_{op2}$ may be supplied to the motor 230 so as to rotate the motor 230 during the normal operation time period.

During the starting operation time period, the inverter controller 430 may set the estimated speed to be 0 such that the q-axis current command value $i^*_q$ is 0 and set the d-axis current command value $i^*_d$ to be a specific value. And the inverter controller 430 may output the inverter switching control signal Sic based on the d-axis current command value $i^*_d$. Thus, the constant first level current $i_{dd2}$ and the constant second level current may be supplied to the motor 230.

During the normal operation time period, the inverter controller 430 may generate current command values $i^*_d$ and $i^*_q$ based on the estimated speed not to be 0, generate voltage command values $V^*_d$ and $V^*_q$ based on the current command values $i^*_d$ and $i^*_q$, generate and output the inverter switching control signal Sic based on the voltage command values $V^*_d$ and $V^*_q$. Thus, the AC current $i_{op2}$ may be supplied to the motor 230 so as to rotate the motor 230 at a constant speed or at an accelerated speed.

In a case in which a constant current is supplied to the motor 230 during the starting operation time period of the motor 230, a voltage command for controlling current may be changed. The washing tub may move during the starting operation time period in which the alignment currents $i_{dd1}$ and $i_{dd2}$ are supplied to the motor 230. A voltage vector is also changed in response to such motion of the washing tub.

As a result, time during which an operation of aligning the motor to a designated position converges is increased. In a case in which a discontinuous PWM switching control signal is used as a switching control signal, electrical noise may be generated from the motor 230.

In order to reduce time necessary to align the rotor of the motor and to prevent noise during the starting operation time period, the present disclosure proposes a method of fixing a direction of the voltage vector or fixing a period of the voltage vector.

Figure 7:
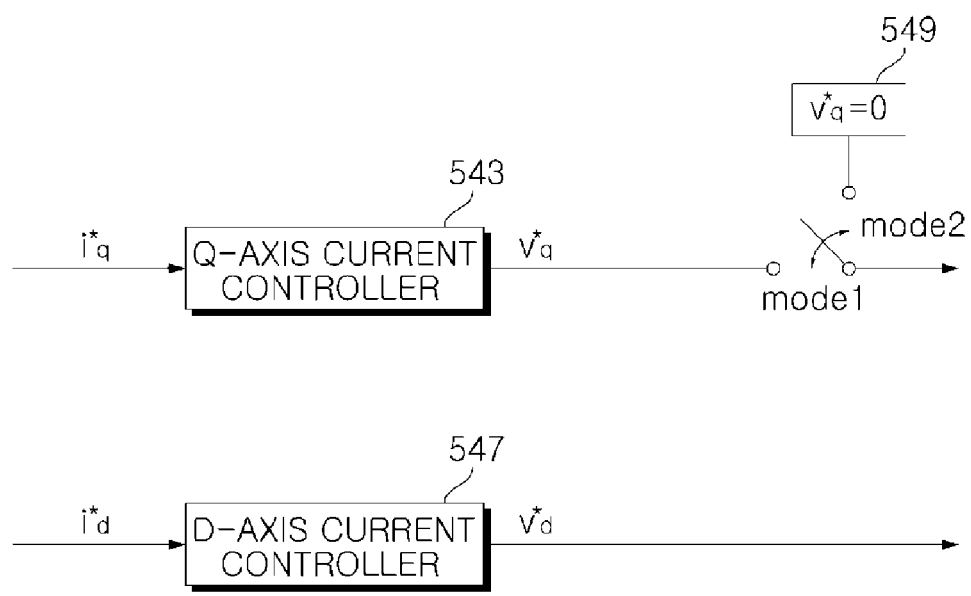
FIG. 7 is a reference view illustrating fixing of a voltage vector according to an embodiment of the present disclosure.

FIG. 7 is a reference view illustrating fixing of a voltage vector according to an embodiment of the present disclosure. The inverter controller 430 may include a q-axis current controller 543 for controlling a q-axis current and a d-axis current controller 547 for controlling a d-axis current. In addition, the inverter controller 430 may further include a q-axis voltage fixing unit 549 for fixing a q-axis voltage command value.

The q-axis current controller 543 and the d-axis current controller 547 may be included in the voltage command generation unit 540 previously described with reference to FIG. 5A. In particular, the q-axis current controller 543 and the d-axis current controller 547 may correspond to the PI controller 544 and the PI controller 548 of FIG. 5, respectively. The inverter controller 430 performs sensorless normal operation control previously described with reference to FIGS. 4 to 5B as a first mode (mode 1) during the normal operation time period for rotating the motor 230. That is, d-axis and q-axis voltage command values v*$_q$ and v*$_d$ respectively output from the q-axis current controller 543 and the d-axis current controller 547 may be output without being changed. In addition, an inverter switching control signal for controlling the inverter 420 may be output based on the d-axis and q-axis voltage command values v*$_d$ and v*$_q$.

On the other hand, the inverter controller 430 may set the q-axis voltage command value to a fixed value as a second mode (mode 2) during the starting operation time period for aligning the rotor of the motor 230. In the drawing, the q-axis voltage command value v*$_q$ is set to 0.

In a case in which the q-axis voltage command value is set to the fixed value as described above, a current command value for rotating the motor 230 in a direction opposite to partial movement of the motor 230 is generated according to Equations 7 to 10 below. Consequently, it is possible to more rapidly align the rotor of the motor 230 than in a case in which a constant level current is supplied to the motor 230.

Equations 7 and 8 below represent voltage equations of the motor 230 based on a two phase synchronous rotating coordinate system.

$$V_d = R_s i_d + L_s \frac{di_d}{dt} - \omega_r L_s i_q \qquad \text{[Equation 7]}$$

$$V_q = R_s i_q + L_s \frac{di_q}{dt} + \omega_r L_s i_d + K_e \omega_r \qquad \text{[Equation 8]}$$

where $R_s$ indicates stator resistance of the motor 230, $L_s$ indicates inductance of the motor 230, $\omega_r$ indicates rotational speed of the motor 230, and $K_e$ indicates a back electromotive force constant. In addition, $i_d$ and $i_q$ indicate d-axis current and q-axis current, respectively, $v_d$ and $v_q$ indicate d-axis voltage and q-axis voltage, respectively, and $K_e \omega_r$ indicates back electromotive force induced from the motor 230.

In a case in which $v_q$ is set to 0 according to the second mode (mode 2) during the starting operation time period, $$L_s \frac{di_q}{dt}$$

and $\omega_r L_s i_d$ in Equation 8 are 0 or approximate to 0. As a result, Equation 8 may be arranged into Equation 9 below.

$$0 = R_s i_q + K_e \omega_r \qquad \text{[Equation 9]}$$

The q-axis current $i_q$ may be defined as represented by Equation 9

$$i_q = -\frac{K_e \omega_r}{R_s} \qquad \text{[Equation 10]}$$

As a result, the q-axis current $i_q$ may be generated in a direction opposite to the back electromotive force $K_e \omega_r$.

In a case in which the inverter controller 430 sets $V_d$ to a predetermined value and $V_q$ to 0 during the starting operation time period, a q-axis current command value i*$_q$ is set to a value (e.g., a reversal value) corresponding to the direction opposite to the back electromotive force $K_e \omega_r$ according to sensorless feedback control.

The inverter controller 430 may control the inverter 420 to supply current corresponding to the direction opposite to the back electromotive force induced from the motor 230 to the motor 230 so as to align the motor 230 during the starting operation of the motor.

For example, the inverter controller 430 may set the torque voltage of the flux voltage and the torque voltage supplied to the motor 230 to a constant value so as to drive the motor 230 during the starting operation of the motor 230. Specifically, the inverter controller 430 may set the torque voltage to 0 such that only the flux voltage is supplied to the motor. It is possible to more rapidly align the rotor of the motor 230 than in a case in which a constant level current is supplied to the motor 230.

Figure 8:
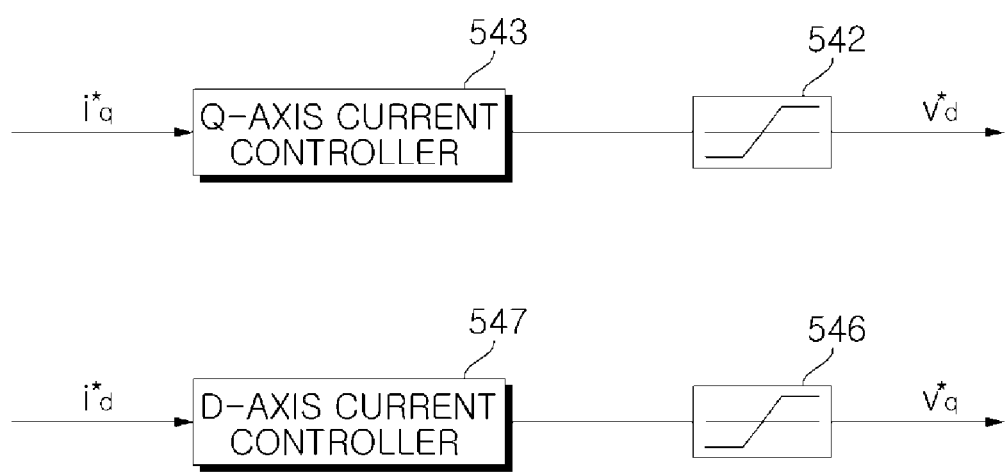
FIG. 8 is a reference view illustrating fixing of a voltage vector period according to another embodiment of the present disclosure.
Figure 9:
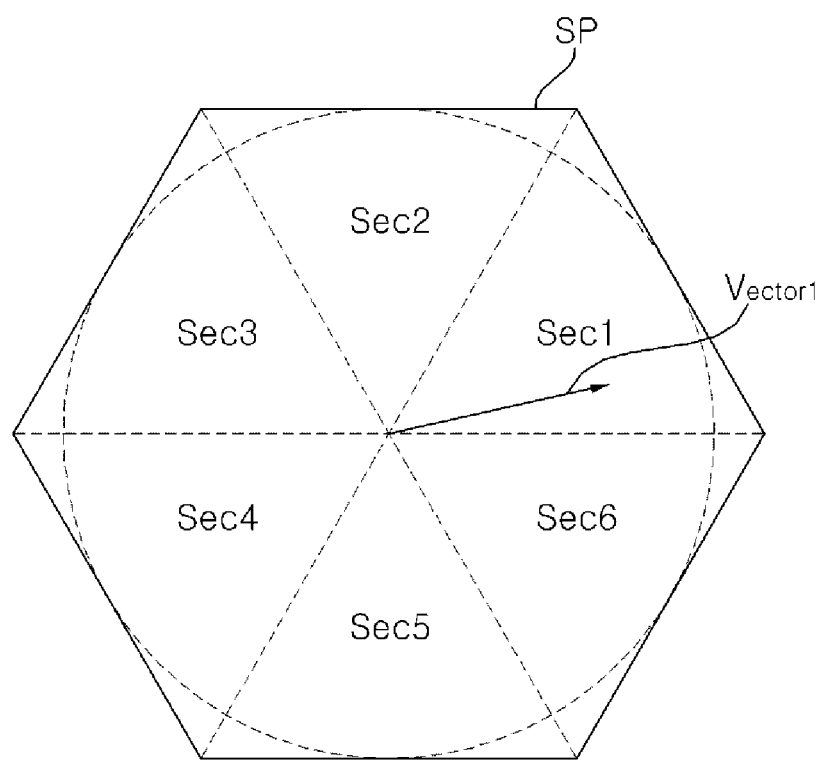
FIG. 9 is a reference view illustrating FIG. 8.

FIG. 8 is a reference view illustrating fixing of a voltage vector period according to another embodiment of the present disclosure and FIG. 9 is a reference view illustrating FIG. 8. The inverter controller 430 may include a limiter for limiting a level of at least one of the flux voltage and the torque voltage supplied to the motor so as to align the motor during the starting operation of the motor. The inverter controller 430 may include a limiter 542 for limiting a q-axis voltage command value and a limiter 546 for limiting a d-axis voltage command value respectively coupled to a q-axis current controller 543 and a d-axis current controller 547.

In a case where a switching control signal is generated using a space vector method, the limiter may limit a level of at least one of the flux voltage and the torque voltage supplied to the motor. As such, a voltage vector during the starting operation of the motor is located at the same sector selected from among a plurality of space vector sectors so as to align the motor during the starting operation of the motor.

The limiter 542 and the limiter 546 of FIG. 8 may be respectively disposed at the rears of the PI controller 543/544 and the PI controller 547/548 previously described with reference to FIG. 5. In a case where a space vector-based PWM (SVPWM) switching control signal is generated during the starting operation time period, at least one of the limiter 542 and the limiter 546 is used such that a direction of the voltage vector of FIG. 9 remains in the same sector.

In a case in which the d-axis voltage command value and the q-axis voltage command value are limited using the limiter 542 or the limiter 546 during the starting operation time period as described above, the voltage command value is reduced into a predetermined range at the time of aligning the rotor of the motor. Hence, movement during alignment is reduced. It is feasible to more rapidly align the rotor of the motor than in a case in which a constant current is supplied to the motor.

Figure 10:
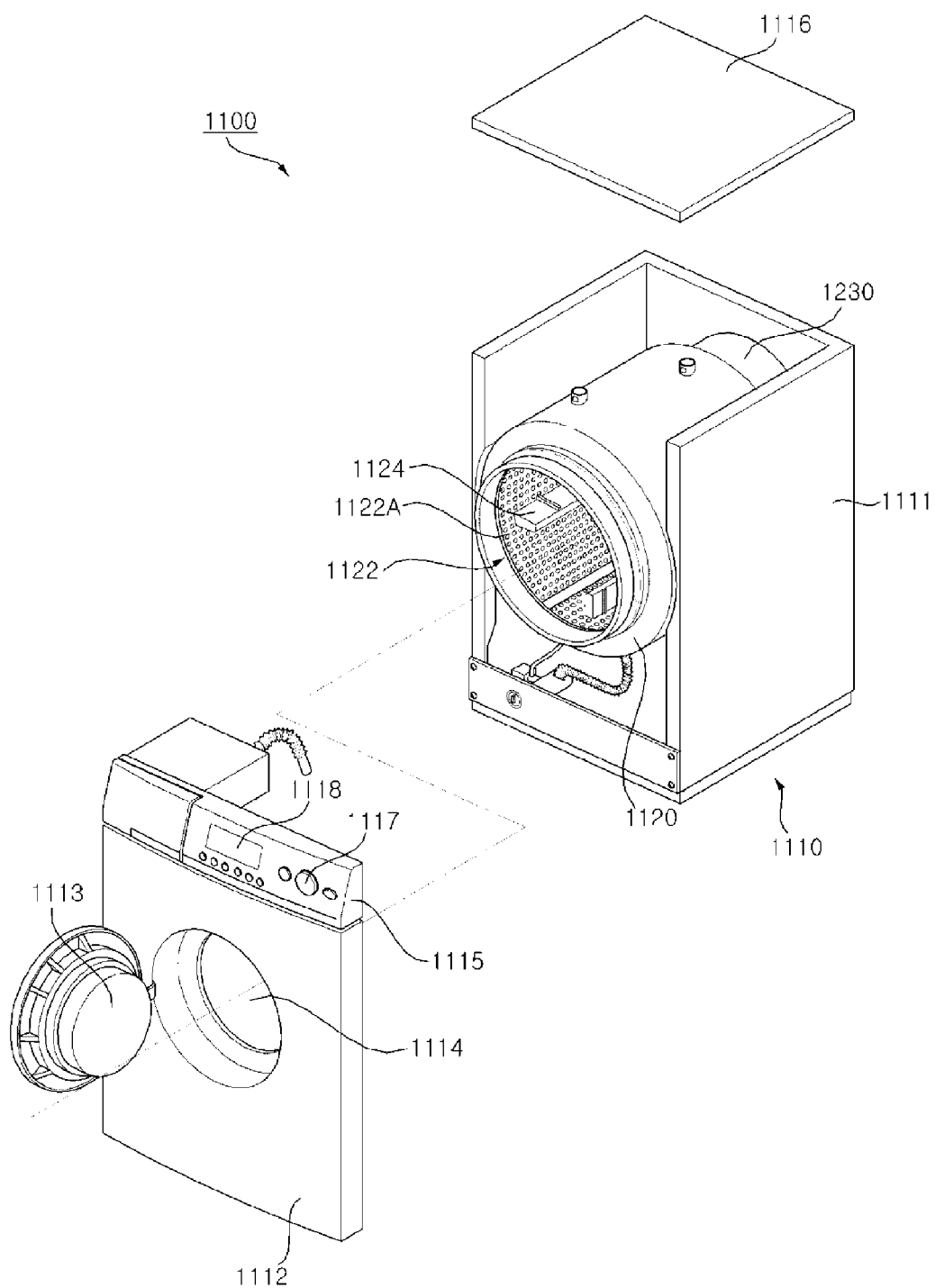
FIG. 10 is a perspective view showing another example of a laundry treatment machine according to another embodiment of the present disclosure.

The sensorless laundry treatment machine according to the present disclosure may be also applied to a front load type laundry treatment machine in addition to the top load type laundry treatment machine of FIG. 1. FIG. 10 is a perspective view showing another example of a laundry treatment machine according to another embodiment of the present disclosure.

A laundry treatment machine 1100 is a front load type laundry treatment 1100 machine configured such that laundry is introduced into a washing tub from the front. The front load type laundry treatment machine may be operated in a sensorless mode as previously described with reference to FIGS. 1 to 5B. In particular, fixing of the voltage vector value or the voltage vector period during the starting operation time period as shown in FIGS. 7 and 8 may be applied to the front load type laundry treatment machine of FIG. 11.

The laundry treatment machine 1100, which is a drum type laundry treatment machine, includes a cabinet 1110 forming the external appearance of the laundry treatment machine 1100, and a tub 1120 disposed in the cabinet 1110 such that the tub 1120 is supported by the cabinet 1110. A drum 1122 is disposed in the tub 1120 for washing laundry, and a motor 1130 drives the drum 1122. A wash water supply device is disposed at the outside of a cabinet body 1111 for supplying wash water into the cabinet 1110, and a drainage device is disposed at the lower side of the tub 1120 for draining wash water to the outside.

The drum 1122 may be provided with a plurality of through holes 1122A through which wash water flows. The drum 1122 may be provided at the inner circumference thereof with lifters 1124 for raising laundry to a predetermined height such that the laundry drops due to gravity during rotation of the drum 1122.

The cabinet 1110 includes a cabinet body 1111, and a cabinet cover 1112 disposed at the front of the cabinet body 1111 in a state in which the cabinet cover 1112 is coupled to the cabinet body 1111. A control panel 1115 is disposed at the upper side of the cabinet cover 1112 in a state in which the control panel 1115 is coupled to the cabinet body 1111. A top plate 1116 is disposed at the upper side of the control panel 1115 in a state in which the top plate 1116 is coupled to the cabinet body 1111.

The cabinet cover 1112 includes a laundry introduction port 1114 through which laundry is introduced into the drum 1122. A door 1113 is horizontally hinged to the cabinet cover 1112 for opening and closing the laundry introduction port 1114.

The control panel 1115 includes manipulation keys 1117 for allowing a user to manipulate an operation state of the laundry treatment machine 1100. A display 1118 is disposed at one side of the manipulation keys 1117 for displaying the operation state of the laundry treatment machine 1100.

The manipulation keys 1117 and the display 1118 of the control panel 1115 are electrically connected to a controller. The controller electrically controls components of the laundry treatment machine 1100.

The drum 1122 may be provided with an automatic balancer. The automatic balancer functions to reduce vibration generated from the drum 1122 due to eccentricity of laundry received in the drum 1122. A liquid balancer or a ball balancer may be used as the automatic balancer. The laundry treatment machine 1100 may further include a vibration sensor for measuring vibration of the drum 1122 or the cabinet 1110.

The motor driving method or the operation method of the laundry treatment machine according to the embodiments of the present disclosure may be realized as code, which is readable by a processor included in the motor driving apparatus or the laundry treatment machine, in recording media readable by the processor. The recording media readable by the processor includes all kinds of recording devices to store data which are readable by the processor. For example, various functions of circuitry or circuits described above may be implemented by a controller or processor executing codes or programs on a recordable media. As can be appreciated, the circuitry or circuits may be implemented by at least one module.

As is apparent from the above description, in a motor driving apparatus and a laundry treatment machine including the same according to an embodiment of the present disclosure, current corresponding to a direction opposite to back electromotive force induced from a motor is supplied to the motor so as to align the motor during a starting operation of the motor. Consequently, it is possible to rapidly align a rotor of the motor during the starting operation of the motor.

During a normal operation of the motor, on the other hand, a voltage command value is generated to rotate the motor and an inverter is controlled in response to the generated voltage command value. Consequently, it is possible to efficiently control the motor.

In particular, PWM-based output voltage is detected, a rotor position and speed of the motor are estimated based on the detected output voltage, and a switching control signal for controlling the inverter is output based on the estimated rotor position and speed of the motor. Consequently, it is possible to accurately control the motor in a sensorless mode.

In a motor driving apparatus and a laundry treatment machine including the same according to another embodiment of the present disclosure, a level of at least one selected from between a flux voltage and a torque voltage supplied to a motor is limited so as to align the motor during a starting operation of the motor. Consequently, it is possible to rapidly align a rotor of the motor during the starting operation of the motor.

It is an object of the present disclosure to provide a motor driving apparatus that is capable of rapidly aligning a rotor of a motor during a starting operation of the motor and a laundry treatment machine including the same.

A laundry treatment machine includes a washing tub, a motor to rotate the washing tub, and a driving unit to drive the motor, wherein the driving unit includes an inverter to convert direct current (DC) voltage into alternating current (AC) voltage and to output the AC voltage to the motor and an inverter controller to control the inverter to supply current corresponding to a direction opposite to back electromotive force generated from the motor to the motor so as to align the motor during a starting operation of the motor.

A laundry treatment machine includes a washing tub, a motor to rotate the washing tub, and a driving unit to drive the motor, wherein the driving unit includes an inverter to convert DC voltage into AC voltage and to output the AC voltage to the motor and an inverter controller to output a switching control signal for driving the motor to the inverter, and wherein the inverter controller includes a limiter to limit a level of at least one selected from between a flux voltage and a torque voltage supplied to the motor so as to align the motor during a starting operation of the motor.

A motor driving apparatus includes an inverter to convert DC voltage into AC voltage and to output the AC voltage to a motor and an inverter controller to control the inverter to supply current corresponding to a direction opposite to back electromotive force generated from the motor to the motor so as to align the motor during a starting operation of the motor.

This application is related to U.S. application Ser. Nos. 14/535,702, 14/536,004, and 14/535,780 filed on Nov. 7, 2014, whose entire disclosures are incorporated herein by reference.

Any reference in this specification to "one embodiment," "an embodiment," "example embodiment," etc., means that a particular feature, structure, or characteristic described in connection with the embodiment is included in at least one embodiment of the disclosure. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A laundry treatment machine comprising:
   a washing tub;
   a motor to rotate the washing tub; and
   a driving circuitry to control at least one of voltage and current provided to the motor, wherein the driving circuitry includes:
   an inverter to convert direct current (DC) voltage into alternating current (AC) voltage and to output the AC voltage to the motor; and
   an inverter controller to continuously output a pulse width modulation (PWM) switching control signal to the inverter, and to control the inverter to supply current corresponding to a direction opposite to back electromotive force generated from the motor to the motor so as to align the motor during a starting operation of the motor,
   wherein the inverter controller controls the inverter to supply only flux voltage to the motor so as to align the motor during the starting operation of the motor, and
   wherein the inverter controller controls the inverter to supply the flux voltage and torque voltage to the motor so as to drive the motor during a normal operation after the starting operation.

2. The laundry treatment machine according to claim 1, wherein the inverter controller generates a voltage command value to rotate the motor during the normal operation of the motor and controls the inverter in response to the generated voltage command value.

3. The laundry treatment machine according to claim 1, further comprising:
   an output voltage detector to detect output voltage applied to the motor; and
   an output current detector to detect output current flowing in the motor,
   wherein the inverter controller estimates a rotor position of the motor based on the detected output current and a PWM-based output voltage detected by the output voltage detector and outputs an inverter switching control signal for controlling the inverter based on the estimated rotor position of the motor.

4. The laundry treatment machine according to claim 1, further comprising:
   an output voltage detector to detect output voltage applied to the motor; and
   an output current detector to detect output current flowing in the motor, wherein the inverter controller includes:
   an estimation circuitry to estimate a rotor position and speed of the motor based on the detected output current and PWM-based output voltage detected by the output voltage detector;
   a current command generation circuitry to generate a current command value based on the estimated speed of the motor and a speed command value;
   a voltage command generation circuitry to generate a voltage command value based on the current command value and the detected output current; and
   a switching control signal output circuitry to output a switching control signal for driving the inverter based on the voltage command value.

5. The laundry treatment machine according to claim 4, wherein the voltage command generation circuitry comprises:
   a d-axis voltage command generation circuitry to generate the flux voltage command value; and
   a q-axis voltage command generation circuitry to generate the torque voltage command value, and
   wherein the q-axis voltage command generation circuitry sets a q-axis voltage command to 0 so as to align the motor during the starting operation of the motor.

6. The laundry treatment machine according to claim 4, wherein the estimation circuitry comprises:
   a back electromotive force estimation circuitry to estimate back electromotive force generated from the motor based on the detected output current and the detected PWM-based output voltage; and
   a speed estimation circuitry to estimate the rotor position and speed of the motor based on the estimated back electromotive force.

7. The laundry treatment machine according to claim 1, wherein
   the inverter controller comprises a limiter to limit a level of the flux voltage and supplied to the motor so as to align the motor during the starting operation of the motor.

8. The laundry treatment machine according to claim 7, wherein in a case in which the switching control signal is generated using a space vector method, the limiter limits a level of the flux voltage supplied to the motor such that a voltage vector during the starting operation of the motor is located at the same sector selected from among a plurality of space vector sectors so as to align the motor during the starting operation of the motor.

9. A motor driving apparatus comprising:
   an inverter to convert DC voltage into AC voltage and to output the AC voltage to a motor; and
   an inverter controller to continuously output a pulse width modulation (PWM) switching control signal to the inverter, and to control the inverter to supply current corresponding to a direction opposite to back electromotive force generated from the motor to the motor so as to align the motor during a starting operation of the motor,
   wherein the inverter controller controls the inverter to supply only flux voltage to the motor so as to align the motor during the starting operation of the motor, and
   wherein the inverter controller controls the inverter to supply flux voltage and torque voltage to the motor so as to drive the motor during a normal operation after the starting operation.

10. The motor driving apparatus according to claim 9, wherein the inverter controller generates a voltage command value to rotate the motor during the normal operation of the motor and controls the inverter in response to the generated voltage command value.

11. The motor driving apparatus according to claim 9, further comprising:
- an output voltage detector to detect output voltage applied to the motor; and
- an output current detector to detect output current flowing in the motor, wherein
- the inverter controller estimates a rotor position of the motor based on the detected output current and a PWM-based output voltage detected by the output voltage detector and outputs an inverter switching control signal for controlling the inverter based on the estimated rotor position of the motor.

12. The motor driving apparatus according to claim 9, further comprising:
- an output voltage detector to detect output voltage applied to the motor; and
- an output current detector to detect output current flowing in the motor, wherein
- the inverter controller includes: an estimation circuitry to estimate a rotor position and speed of the motor based on the detected output current and PWM-based output voltage detected by the output voltage detector;
- a current command generation circuitry to generate a current command value based on the estimated speed of the motor and a speed command value;
- a voltage command generation circuitry to generate a voltage command value based on the current command value and the detected output current; and
- a switching control signal output module to output a switching control signal for driving the inverter based on the voltage command value.

13. The motor driving apparatus according to claim 12, wherein the voltage command generation circuitry comprises:
- a d-axis voltage command generator to generate the flux voltage command value; and
- a q-axis voltage command generator to generate the torque voltage command value, and wherein
- the q-axis voltage command generator sets a q-axis voltage command to 0 so as to align the motor during the starting operation of the motor.

14. The motor driving apparatus according to claim 12, wherein the estimation circuitry comprises:
- a back electromotive force estimation circuitry to estimate back electromotive force generated from the motor based on the detected output current and the detected PWM-based output voltage; and
- a speed estimation circuitry to estimate the rotor position and speed of the motor based on the estimated back electromotive force.

\* \* \* \* \*